Sept. 8, 1959  B. H. CISCEL  2,902,772
GYROSCOPIC COMPASS
Filed Oct. 1, 1951  3 Sheets-Sheet 2

INVENTOR.
BENJAMIN H. CISCEL
BY George H Fisher
ATTORNEY

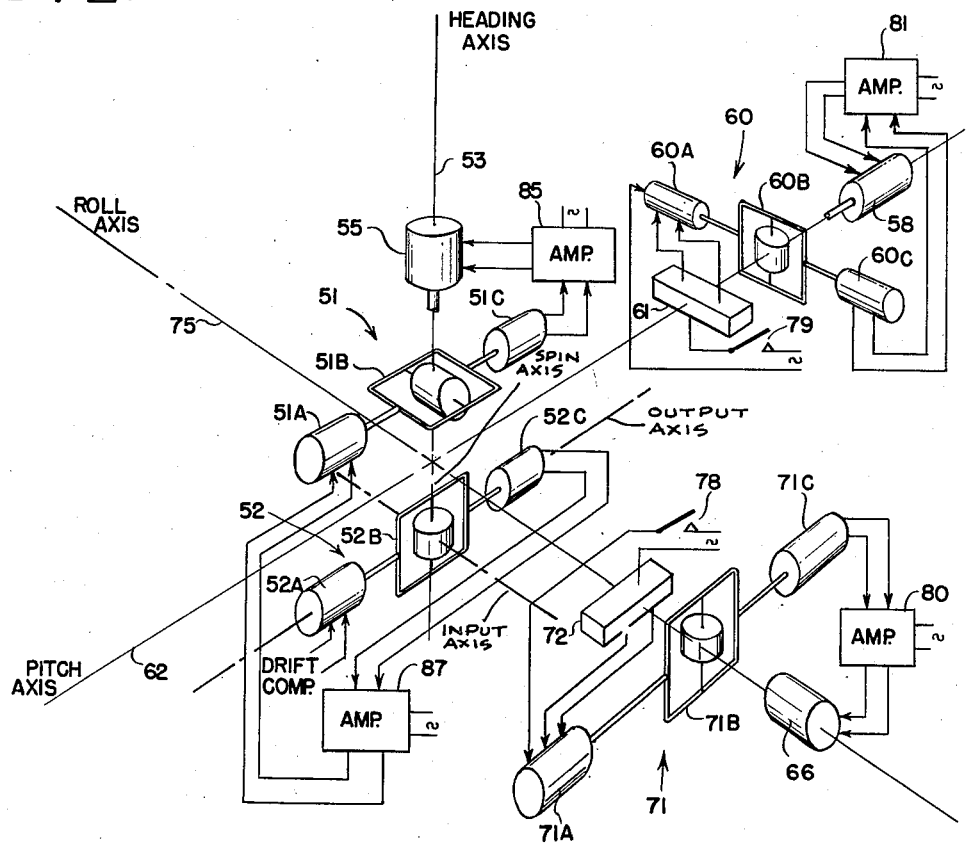

United States Patent Office 2,902,772
Patented Sept. 8, 1959

2,902,772

GYROSCOPIC COMPASS

Benjamin H. Ciscel, Minnetonka Mills, Minn., assignor to Minneapolis-Honeywell Regulator Company, Minneapolis, Minn., a corporation of Delaware Application October 1, 1951, Serial No. 249,141

6 Claims. (Cl. 33—226)

The present invention is concerned with a gyroscopic compass which may be used to establish a predetermined direction on the surface of the earth. More particularly, the present invention is concerned with a single degree of freedom integrating gyroscope which senses the rate of rotation of the earth when an axis thereof is displaced from the plane of a longitudinal meridian and has an output precessional signal which is used to drive the gyroscope to a null position where it will not sense the rotation of the earth.

Most present day gyroscopic compasses are heavy, cumbersome, and rely in part on the pendulous effects of some device acting with the gyro wheel to obtain meridian seeking tendencies. The present apparatus obtains its meridian seeking tendencies solely from the apparatus's sensing of the earth's rate of rotation and does not rely on any pendulous effects to cause precession of the apparatus. This meridian seeking tendency is also made possible by restricting the movement of the gyro wheel in its gimbal to a single degree or plane and orienting the gyro wheel and its axis by supporting gimbals and Cardan rings so that when the apparatus is properly oriented with respect to the earth's coordinates there will be no output signal from the gyroscope.

It is therefore an object of the present invention to provide a new and improved gyroscopic compass system.

A further object of the present invention is to provide a gyroscopic compass using a single degree of freedom gyroscope.

Another object of the present invention is to provide a gyroscope compass system wherein the gyro wheel is maintained in a plane which will permit maximum sensing of the rate of rotation of the earth.

Still another object of the present invention is to provide a gyroscopic compass apparatus wherein a single degree of freedom gyroscope is used having a damping means associated therewith to give an output signal which is indicative of the integral of the output precessional torque of the gyroscope.

A still further object of the present invention is to provide a gyroscopic compass apparatus where a gyroscopic device has an output signal indicative of rotation of the earth and said signal is used to drive the apparatus to a null position where there would be no output.

Another object of the present invention is to provide an automatically stabilized gyroscopic compass apparatus utilizing the foregoing objects.

These and other objects of the present invention will be understood upon the consideration of the following specification and the drawings of which:

Figure 3 shows in block diagram form the apparatus shown in Figure 2.

Figure 1:
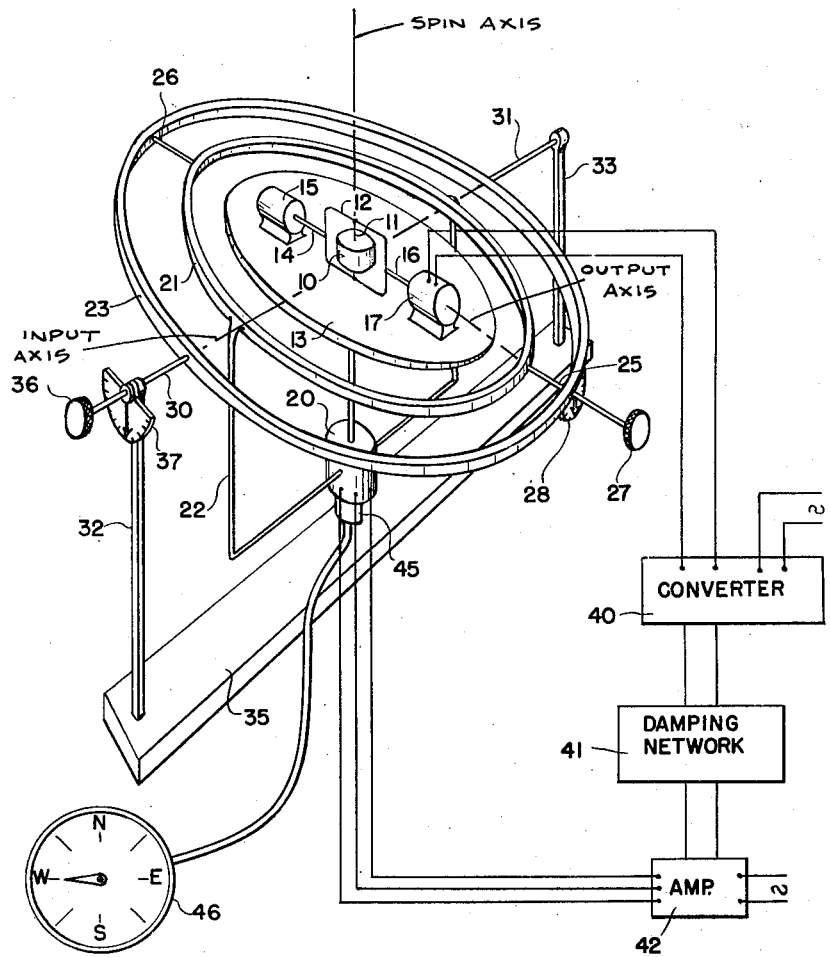
Figure 1 shows a simplified embodiment of the invention.

Referring to Figure 1, the numeral 10 represents a gyro rotor or wheel which is rotatably driven at a high speed by any suitable means, not shown. A supporting shaft 11, which defines the spin axis of the gyroscope, is journalled in a gimbal ring 12. The gimbal ring is carried on and attached to a rotatable platform 13 by means of a shaft 14 journalled for rotation in a device 15, which is primarily a viscous damper as well as a supporting bearing, and a shaft 16 which is journalled for rotation in device 17 which is primarily an electrical signal generating device and a support bearing. The shafts 14 and 16 define the precession or output axis of the apparatus and since this is the only precession axis of the apparatus, it is referred to as a single degree of freedom gyroscope. The axis of the gyroscope perpendicular to spin and output axes will be referred to as the input axis, since torque applied thereabout will cause precession about the output axis. The assembly of the gyro rotor 10 and ring 12 in which it is journalled together with the shafts 14 and 16, the signal generator 17 and the damper 15, which may as will be later noted include a torquer, is to be considered as forming the gyroscope.

The platform 13 is carried and rotatably positioned by a motor 20. The motor 20 is carried by a Cardan ring 21 which has a connecting member 22 rigidly fastening the motor thereto. The ring 21 is carried by shafts 25 and 26 and is journalled in a further Cardan ring 23 by means not shown. This ring 21 is arranged to be angularly set with respect to ring 23 by an adjusting means 27 which setting means may be either manual or automatic. An indicating dial 28 is used to show the relative displacement of ring 21 with respect to ring 23.

The ring 23 is pivotally carried by shafts 30 and 31 which are journalled in support members 32 and 33 respectively. Support members 32 and 33 are mounted on a base member 35. The angle of the ring 23 with respect to the base is settable by means of the adjusting device 36 which is shown as a manual knob though it may be automatic. A dial 37 is used to indicate the relative position of the base with respect to the ring 23.

If a conventional microsyn is used in the signal generating device 17, the output signal will be an alternating current signal which will be fed to an A.C. to D.C. converter 40 and from there through a suitable stabilizing or damping network 41. The output of the damping network 41 is fed to an amplifier 42 whose output is connected to reversibly drive the motor 20. The amplifier-motor combination may be of the type disclosed in the A. P. Upton patent, 2,423,534, issued July 8, 1941. This amplifier-motor combination is arranged to cause movement of the motor output shaft in one direction or the other depending upon the phasing or polarity of the input signal to the amplifier.

Attached to the lower end of the motor 20 is a positional transmitting synchro 45 which is operatively connected to a receiver indicated unit 46. The receiver 46 may be arranged to indicate the relative position between the platform 13 and the base 35 in terms of compass coordinates.

Before considering the operation of the present apparatus as a whole, the operation characteristics of the single degree of freedom gyroscope, should be noted. With the rotor 10 spinning on its axis 11 in its support 12, the gyroscope possesses gyroscopic rigidity about its input axis. A turning movement applied to the gyroscope about this axis will result in precessional movement of the rotor support 12 about the output axis causing rotation of the shafts 14 and 16 in their respective pivots and providing an output signal from the generator 17. Rotating the gyroscope about its spin axis or about an axis parallel to the spin axis will merely add or subtract from the angular momentum of the rotor wheel 10 and will not affect the output of the gyroscope and no resultant movement will occur about the output axis. Similarly because this gyroscope is not gimballed for precession about the input axis, and has only one axis of precession, rotation of the base and platform about an axis parallel to or coincident with the output axis will cause the rotor support 12 and the rotor 10 of the gyroscope to rotate with the casing of the gyroscope without relative movement between the gyroscope casing and the gyroscope shafts 14 and 16 and no output signal will be obtained therefrom. Similarly any input movement experienced in the plane defined by the output axis and the spin axis will have the same result and no output signal will be obtained from the generator. On the other hand, any input movement about an axis other than those contained in said plane will result in a component of movement about the input axis and will tend to cause precession of the gyroscope and rotation of the shafts 14 and 16 of the output axis to provide a signal from the generator 17. This component of input movement about the input axis will be maximum when the input is applied directly to or coincident with the input axis and will reduce to zero as the axis of rotation approaches the plane of the output axis and the spin axis.

For the purpose of explaining the operation of the present apparatus, let us first assume that the apparatus is positioned such that the output axis of the gyroscope on the platform 13 is in a vertical plane parallel to the polar axis of the earth which position inherently locates the input axis of the gyroscope if horizontal in an east-west direction or plane, because of the normal or 90° relationship between the axes of the gyroscope. It will also be assumed at the same time that the supporting structure for platform 13, which includes base 35, members 32, 33, rings 23, 21 and member 22 is so positioned that the output axis of the gyroscope is aligned with the shafts 25—26, and the shafts 30—31 lie in the same plane as the input axis of the gyroscope. Under these conditions, the setting means 27 will be effective to position the platform 13 for setting purposes about a first axis parallel to the earth's surface. The adjusting means 36 will be effective to position the platform in this assumed position for setting purposes about a second axis which is the east-west direction and as will be later noted, may be utilized to adjust for variation in latitude. The adjustment means 27 and 36 are utilized to set the platform while it is at rest with respect to member 22 to a substantially parallel relationship with the earth's surface, that is, when the platform is not being rotated by the motor in response to gyroscope output. As will be later noted from the operation of the gyroscope under the influence of earth's rotation, once an approximation of the east-west direction is obtained, the sensitivity of the apparatus may be increased by adjusting the platform about the axes 30—31 for the approximate latitude to bring the output axis of the gyroscope into substantial parallelism with the earth's polar axis. Should the position of the base be changed 90°, the functioning of the adjustment means 27 and 36 will be reversed since the platform is free to rotate with respect to member 22 of the supporting structure.

Thus with a single degree of freedom gyroscope mounted on the platform 13 and with the output axis in a position substantially in the vertical plane of the earth's polar axis, and with the base 35 fixed to the earth's surface or positioned thereon, the apparatus will stay in the position shown even though there will be extraneous forces, such as frictional forces, acting on the gyroscope rotor about the output axis tending to cause precession. As the precession tendency for a single degree of freedom gyroscope is responsive only to motions having components about the input axis, which is normal to the output axis, there will be no output from the signal generator 17, since movement about the input axis is restricted and precessional torque is insufficient to move the supporting platform 13 or the rings 21 and 23. This condition is known as the null condition for the gyroscopic indicator. Now consider a second assumed position in which the apparatus is displaced such that the output axis of the gyroscope is no longer in the vertical plane of the earth's polar axis and the input axis is no longer in an east-west direction. The gyroscope will sense the rotation of the earth and there will be a component of earth's rotation acting about the input axis of the gyroscope providing a torque thereabout. The magnitude of this torque will be proportional to the angular displacement of the input axis from the east-west plane. The resultant precessional torque caused by this force, that is earth rotation, will cause the gimbal 12 to rotate about the output axis and cause displacement of the signal generator 17 so that there will be an output signal. As the movement of the ring 12 must cause movement of the damper 15 this viscous damper functions to cause the output signal to be the time integral of the output torque causing rotation of the gimbal 12.

The output signal on the signal generator 17, whose phasing or polarity is dependent upon the direction of displacement of gimbal 12 about the output axis of the gyroscope, is fed to the converter 40, damping network 41 and amplifier 42 and from there to the control motor 20. The control motor 20 will be controllably energized by the amplifier 42 and in a direction which will cause the platform 13 to be moved back to the null position where there will be no output signal from the signal generator 17. This null position is reached when the input axis is again aligned with the east-west plane and earth's rotation is not sensed.

An indication of this null position with respect to the base, that is, the position of the platform 13 and the gyroscope thereon with respect to the base, is given by the transmitting synchro 45 which sends a signal to a receiver 46 which as is shown in the drawing indicates the platform to be in a certain relationship with respect to the east-west plane. The base can then be manually repositioned and with operation of the motor 20 rotating the platform 13 as earth's rotation is sensed, a position for the base 35 in an east-west direction may be arrived at, giving a reference north-south line normal to the extent of the base. Another indication would be the position of the gyroscope on the platform 13 with respect to the surface of the earth which in the null position would be substantially aligned with the north-south direction.

Consider the apparatus in use under actual circumstances where approximate latitudes would be known but a true north direction would not be known. The base 35 would be positioned on the surface of the earth and the adjustment members 27 and 36 would be adjusted such that the platform would be approximately parallel to this earth's surface or horizontal at that location. If desired a suitable leveling indicating mechanism can be placed on the platform but this is not necessary for operation of the device. The base would probably be positioned with shafts 30 and 31 in other than an east-west direction and as the apparatus is turned on the gyroscope is energized, the input axis of the gyroscope and the output axis thereof will bear some unknown relationship with respect to the east-west direction and the plane of the earth's polar axis. Assuming that the output axis of the device is not in the meridian plane of the earth's polar axis, the input axis will have impressed thereon a component of earth's rotation which will tend to cause precession about the axis 14—16 energizing the generator 17 and causing rotation of the motor 20 to position the platform until the input axis is moved to an east-west plane and the output axis is positioned in the plane of the earth's polar axis. It will be recognized that for latitudes other than the Equator, and with the platform aligned substantially horizontal the output axis of the gyroscope at the null condition will not be parallel with the earth's polar axis and hence the sensitivity of the device will not be at a maximum level. It will be recognized that at the null condition, and with the shafts 30 and 31 on the base in other than in an east-west direction, the indicator will be pointing at other than west and the variation on the indicator from the west will indicate the variation of the position of the base 35 from the east-west direction. The base may then be manually positioned as previously indicated by adjustment of the same so that shafts 30 and 31 are moved toward the east-west direction the amount of the variation indicated on the indicator with a resultant operation of the gyroscope and the positioning of the platform to bring the indicator to a west indication. From this indication the north-south direction may be readily obtained. It should be recognized that this apparatus will indicate a north-south direction and it is possible that the apparatus will be so positioned that in the null condition an east indication could be obtained. In any event it is expected once the north-south line is determined that the operator would be able to distinguish north from south. To increase the sensitivity of the apparatus and to obtain a more accurate indication of the north-south direction, once the approximate east-west direction is located one or the other of the adjustment mechanisms 27—36 may be moved to position the platform 13 through movement of the respective rings 21 or 23 to compensate for the latitude of the location. Thus assuming that the base 35 is approximately east-west, the adjustment mechanism 36 may be moved to tilt the platform in a direction to correspond to the present or approximate latitude of the location and bring the plane of the platform and hence the output axis of the gyroscope into a location substantially parallel with this polar axis or the condition of maximum sensitivity of the apparatus. It will further be recognized that as the position of observation is shifted toward either of the poles the sensitivity of the apparatus will diminish unless the compensation is introduced by tilting of the platform. Further, at the location of either of the poles, the apparatus will be inoperative.

The base 35, in considering the above operation, was assumed to have no motion relative to the earth. If the base is carried by a moving craft, it will be obvious that adjustments in the apparatus will have to be made so that the input axis in the east-west plane is maintained horizontal when the apparatus is in a null position. Obviously, this may be done manually, as shown, or by pendulous or other means. Further, the output axis is maintained substantially in a plane parallel to the polar axis of the earth when the apparatus is at a null and this may be done manually or automatically as desired.

Figure 2:
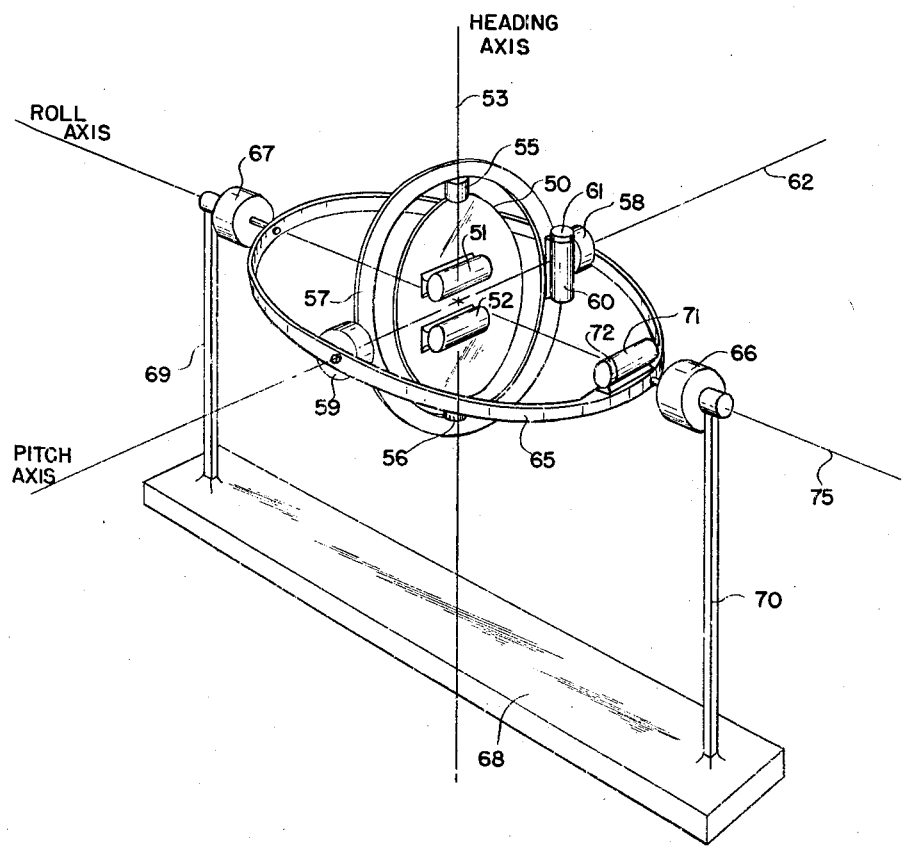
Figure 2 shows schematically one form the invention may take when applied to fast moving craft, for example, aircraft.

Referring now to Figure 2, there is shown one possible arrangement for a gyroscopic compass apparatus, of the type shown in Figure 1, where the apparatus is arranged for use on a fast moving craft such as an aircraft. In this figure, the numeral 50 represents an inner platform which carries a pair of single degree of freedom gyroscopic devices 51 and 52. The gyroscopic device 51 may be defined as a heading sensitive gyroscopic device wherein its input axis is normally parallel with the heading axis of the apparatus indicated by the center line 53. The gyroscopic device 52 is arranged so that its input axis will tend to remain in an east-west plane and may be referred to as the earth's rotational responsive device of the apparatus.

The platform 50 is rotatably journalled on its upper end in a heading stabilization motor 55 and on its lower end in a heading data pick-off 56. As will be explained in connection with Figure 3, the gyroscopic devices 51 and 52 are interconnected and the device 51 and motor 55 are interconnected to maintain the platform 50 aligned in a predetermined manner with an earth's meridian.

The motor 55 and the pick-off 56 are carried by a Cardan ring 57 which in turn is journalled for rotation in a pitch stabilization motor 58 and a pitch data pick-off 59. Mounted on the ring 57 is a pitch axis gyroscopic device 60 having a single degree of freedom and a gravity responsive erection controlling device 61 mounted on the end thereof. This gyroscopic device 60 and the erection controlling device 61 are arranged to control the pitch stabilization motor 58, as will be explained in the discussion of Figure 3 about the pitch axis defined by the center line 62.

The pitch motor 58 and the pitch data pick-off 59 are carried by a further Cardan ring 65, the latter being rotatably journalled in a roll stabilization motor 66 and a roll data pick-off 67. The motor 66 and pick-off 67 are supported on a base member 68 by a pair of supporting members 69 and 70. Mounted on the ring 65 is a further single degree of freedom gyroscopic device 71 having its input axis normally aligned with the displacement axis of ring 65 formed by the journals in roll axis stabilization motor 66 and roll pick-off 67 to be responsive to displacement about the roll axis of the apparatus. A gravity responsive roll erection controlling device 72 is positioned on the end of the gyroscopic device 71 and cooperates therewith to control the motor 66, as will be explained below, about the roll axis defined by the center line 75.

It is desired that the heading axis in the present apparatus be maintained effectively vertical by the apparatus, that is with respect to local vertical, and that the input axis of the gyroscopic device 52 remain in an east-west plane.

Referring now to Figure 3, which is an operational block diagram of the apparatus shown in Figure 2, the reference numerals of the elements of Figure 3 are the same as in Figure 2. It will be noted that each of the gyroscopic devices 51, 52, 60, and 71 has been broken down into its major components which are designated by letters A, B, and C attached to the reference numerals, with the A section being a combined torquer, viscous damper, and pivoting point for the gimbaled gyroscopic wheel section B. Section C is the signal generator of the respective device and also acts as a second pivot point for the B section.

The torquer in the A section of each of the devices may comprise an electric torque producing device which is capable of rotating the B section of the device. The viscous damper in the A section may be of any suitable type as set forth at present in the corresponding section in the device of Figure 1. The signal generator section C of each of the devices is connected through a suitable amplifier combination, as in Figure 1, to a control element, as will be explained below. A pair of erection cut out switches 78 and 79 are provided and are arranged to be opened by a maneuver responsive device such as a rate gyro, not shown.

Considering first the roll stabilization portion of the apparatus, it will be noted that the input axis of the gyroscopic device 71 is aligned with the roll axis center line 75. As the device 71 is mounted on the ring 65, movement of that ring about the roll axis will cause the section 71B of the gyroscopic device to precess and produce an output signal in the signal generator section 71C. This output signal will be fed through an amplifier 80 to the roll stabilization motor 66 to cause this motor to rotate the ring 65 back to its normal position which is horizontal at the diameter of ring 65 normal to roll axis 75.

As the gyroscopic device 71 may be sensitive to the earth's rate of rotation, depending on the relative position of the input axis thereof with respect to the earth's rotation, it is necessary that some correction be provided for this in the form of an erection device. That is the function of the device 72, it taking the form of a mercury switch or other gravity responsive device, as is well known in the art. When the gyroscopic section 71B precesses due to earth's rotation, there will be a resultant movement of the motor 66 and the ring 65. If this movement displaces the diameter of ring 65 which is normal to the roll axis, from horizontal, the erection device will be effective to apply an electrical torquing signal to section 71A to cause the device to call for erection of the above mentioned diameter to horizontal.

If the craft carrying the apparatus should go into a turn, an erection cut out device, not shown, will open the cut out switch 78 so that the erection controlling portion of the apparatus will be inoperative until the turn is completed. When the craft goes into a turn, there will be a component of motion about the roll axis and this will be detected by the gyroscopic device 71 and there will be an output signal which will cause the motor 66 to be driven to maintain the ring 65 in its desired position. As soon as normal level flight is restored, the erection cut out switch will again close and the erection controlling device 72 will be effective, as explained above.

Considering next the pitch axis stabilization portion of the apparatus, it will be noted that the configuration is substantially the same as that of the roll axis portion of the apparatus. Here the output of the gyroscopic device 60 is fed through an amplifier 81 to the pitch stabilization motor 58 which will operate upon the ring 57 to maintain vertical the diameter thereof normal to the pitch axis centerline 62. The erection controlling device 61 and the erection cut out switch 79 function in the same manner as the corresponding elements in the roll axis portion of the apparatus.

The combined effect of the roll and pitch stabilized portions of the apparatus is to maintain vertical the diameter of the platform 50 which passes through the heading stabilization motor 55.

Considering next the heading stabilization portion of the apparatus, it will first be noted that the gyroscopic device 51 has its input axis normally vertical and aligned with the heading axis center line 53. Should the craft go into a turn, or should it drift through an angle about the heading axis, there will be precession of the gyroscopic section 51B and an output signal from the signal generator section 51C. This output signal will be fed through an amplifier 85 to control the heading axis motor 55. This motor 55 will drive the platform 50 until the platform is back in its original position. Thus, when the craft goes into a turn, the platform will effectively be maintained angularly fixed in space.

As there is a tendency for the gyroscopic device 51 to drift over a period of time, it is necessary to provide compensation which will effectively slave the apparatus to one particular reference. This is effectively done by the earth's rotational responsive gyroscopic device 52 which functions in the same general manner as the gyroscopic device of Figure 1. The input axis of the device 52 is normally aligned in an east-west plane on the earth's surface and when so aligned, there will be no output signal. Should the gyroscopic device become displaced so that its input axis is no longer in an east-west plane, there will be precession of the gyroscopic section B which will be due to the earth's rotation. This precession will cause an output signal to appear at section 52C and this in turn is passed through an amplifier 87 to the torquer of the gyroscopic device 51. There will be a torque applied to the section 51B and a resultant rotation which will cause an output signal to appear from the signal generator section 51C. The output from section 51C will in turn act upon the heading motor 55 to cause rotation of the platform 50 until the input axis of the gyroscopic device 52 lies in an east-west plane where it will not sense the earth's rotation. The device 52 thus provides long term stabilization about the heading axis and keeps its input axis and the platform 50 aligned in a predetermined manner with respect to the earth's surface. Should the drift rate of the gyroscopic device 52 be known, a fixed compensating signal may be fed into the torquer in the section 52A to correct for the drift and maintain the accuracy of the apparatus in an extremely high degree.

It will thus be seen that in Figures 2 and 3 there has been provided a system wherein the present invention has been arranged for use in a maneuverable craft. In the present arrangement, the spin axis of the gyroscopic device 52 is maintained vertical. This will mean that in regions near the poles the apparatus will be less sensitive to earth's rotation and at the Equator will have maximum sensitivity. The degree of operability in the polar regions is dependent on the quality of gyroscope used; low drift and highly sensitive gyros being preferred.

From the foregoing it will be seen that there has been provided a new and improved gyroscopic compass which utilizes a single degree of freedom gyroscope which depends for its operation upon the gyroscope sensing the earth's rate of rotation and which when the gyroscope is properly aligned upon the surface of the earth with respect to a plane passing through the earth's polar axis, will have no output signal. Further, there has been provided a highly sensitive gyroscopic compass system which may be utilized with a highly maneuverable craft while the directional qualities of the system are retained.

While many modifications, additions, and changes will be obvious to those skilled in the art, it is intended that the scope of the subject application be limited solely by the appended claims.

I claim:

1. A compass apparatus comprising a base subject to rotative movement in space; motor means on said base and including a part adapted to be rotated about a first axis when said motor means is actuated; a single degree of freedom gyroscope having a spin axis, a single output axis, and a single input axis, said gyroscope including a signal generator responsive to gyroscopic precessive movement about said output axis and adapted to produce a signal as a function of movement about said output axis away from a normal position in which said signal is at a null, said gyroscope also including a damping means associated with said output axis; means mounting said gyroscope on said rotatable part so that said input axis lies in a plane perpendicular to said first axis when said signal is at a null, said gyroscope responding to rotative movement of said base structure about any axis wherein a component of said rotative movement is imparted about said input axis; and means including circuit means connecting said signal generator to said motor means so that said motor means is actuated upon precessive movement of said gyroscope about said output axis to cause rotation of said rotatable part and said gyroscope mounted thereon to a position about said first axis whereat said component of rotative movement imparted about said input axis is reduced to zero.

2. A compass apparatus including a base structure adapted to mount said apparatus on any object subject to rotative movement in space with which it is to be associated, said base structure including a part which is rotatable with respect to the remainder of the base structure and adjustable means carrying said part and adapted to position said part relative to the remainder of the base structure about a pair of axes perpendicular to one another and normally perpendicular to the axis of rotation of said part, motor means connected to said part and said base structure to provide said relative rotatable movement, a single degree of freedom gyroscope having a spin axis, a single output axis and a single input axis, said gyroscope including a signal generator responsive to gyroscopic precession about said output axis and damping means associated with said output axis, means mounting said gyroscope on said rotatable part of said base structure such that the spin axis of said gyroscope is normally parallel with the rotation axis of said part for a normal condition of output of said signal generator, said gyroscope responding to rotative movement of said base structure where at least a component of said movement is applied to the input axis of the gyroscope to cause gyroscopic precessive movement about the output axis thereof, and circuit means connecting said signal generator to said motor of said part on said base structure to control the energization of the same and cause rotation of said part and said gyroscope thereon to align the output axis of the gyroscope with a plane parallel to the spin axis and the axis of rotative movement of the base structure.

3. A compass apparatus including a base structure adapted to mount said apparatus on any object subject to rotative movement in space with which it is to be associated, said base structure including a part which is rotatable with respect to the remainder of the base structure, and adjustable means carrying said part and adapted to position said part relative to the remainder of the base structure about a pair of axes perpendicular to one another and normally perpendicular to the axis of rotation of said part, motor means connected to said part and said base structure to provide said relative rotatable movement, a single degree of freedom gyroscope having a spin axis, a single output axis and a single input axis, said gyroscope including a signal generator responsive to gyroscopic precession about said output axis, means mounting said gyroscope on said rotatable part of said base structure such that the spin axis of said gyroscope is normally parallel with the rotation axis of said part for a normal condition of output of said signal generator, said gyroscope responding to rotative movement of said base structure where at least a component of said movement is applied to the input axis of the gyroscope to cause gyroscopic precessive movement about the output axis thereof, and circuit means connecting said signal generator to said motor of said part on said base structure to control the energization of the same and cause rotation of said part and said gyroscope thereon to align the output axis of the gyroscope with a plane parallel to the spin axis and the axis of rotative movement of the base structure.

4. A compass apparatus including a base structure adapted to mount said apparatus on any object subject to rotative movement in space with which it is to be associated, said base structure including a stationary part and a rotatable part which is rotatable relative to the stationary part about a first axis, the remainder of said base structure including a gimballing structure mounted on said stationary part and mounting said rotatable part for movement about a pair of axes perpendicular to one another and normally perpendicular to the first named axis, means mounted on and connected to said gimballing structure to stabilize said rotatable part in a horizontal plane, motor means connected between the rotatable part and the gimbal structure to provide for the rotative relative movement of said part about said first axis, a single degree of freedom gyroscope having a spin axis, and a single output and a single input axis, said gyroscope including a signal generator responsive to gyroscopic precessive movement about said output axis and a damping means associated with the output axis, means mounting said gyroscope on said rotatable part of said base structure such that said spin axis is normally in a vertical plane, said gyroscope responding to rotative movement of said base structure about an axis such that a component of said movement is imparted to said input axis to cause gyroscopic precessive movement about said output axis, and means including circuit means connecting said signal generator to said motor of said rotatable part to drive said rotatable part and said gyroscope and align the output axis of the gyroscope with a plane parallel to the spin axis and the axis of rotative movement of the base structure.

5. A compass apparatus including a base structure adapted to mount said apparatus on any object subject to rotative movement in space with which it is to be associated, said base structure including a stationary part and a rotatable part which is rotatable relative to the stationary part about a first axis, the remainder of said base structure including a gimballing structure mounted on said stationary part and mounting said rotatable part for movement about a pair of axes perpendicular to one another and normally perpendicular to the first named axis, means mounted on and connected to said gimballing structure to stabilize said rotatable part in a horizontal plane, motor means connected between the rotatable part and the gimbal structure to provide for the rotative relative movement of said part about said first axis, a single degree of freedom gyroscope having a spin axis, and a single output and a single input axis, said gyroscope including a signal generator responsive to gyroscopic precessive movement about said output axis and a damping means associated with the output axis, means mounting said gyroscope on said rotatable part of said base structure such that said spin axis is normally in a vertical plane, said gyroscope responding to rotative movement of said base structure about an axis such that a component of said movement is imparted to said input axis to cause gyroscopic precessive movement about said output axis, means including circuit means connecting said signal generator to said motor of said rotatable part to drive said rotatable part in said gyroscope and align the output axis of the gyroscope with a plane parallel to the spin axis and the axis of rotative movement of the base structure, and torquer means included in said gyroscope and adapted to apply torque about the output axis to modify the precessive movement and compensate for extraneous forces applied to said gyroscope.

6. A compass apparatus including a base structure adapted to mount said apparatus on any object subject to rotative movement in space with which it is to be associated, said base structure including a stationary part and a rotatable part which is rotatable relative to the stationary part about a first axis, the remainder of said base structure including a gimballing structure mounted on said stationary part and mounting said rotatable part for movement about a pair of axes perpendicular to one another and normally perpendicular to the first named axis, means mounted on and connected to said gimballing structure to stabilize said rotatable part in a horizontal plane, motor means connected between the rotatable part and the gimbal structure to provide for the rotative relative movement of said part about said first axis, a single degree of freedom gyroscope having a spin axis, and a single output and a single input axis, said gyroscope including a signal generator responsive to gyroscopic precessive movement about said output axis and a damping means associated with the output axis, means mounting said gyroscope on said rotatable part of said base structure such that said spin axis is normally in a vertical plane, said gyroscope responding to rotative movement of said base structure about an axis such that a component of said movement is imparted to said input axis to cause gyroscopic precessive movement about said output axis, a second single degree of freedom gyroscope mounted on said rotatable part of said base structure and having input, output and spin axes with the spin axis positioned normal to the spin axis of the first gyroscope and with its input axis normally positioned parallel to the rotatable axis of said part, a torquer and signal generator included on the output axis of said second gyroscope, circuit means connecting said signal generator of the first named gyroscope to the torquer of said second gyroscope to slave the latter to the former, and further circuit means connecting said signal generator of said second gyroscope to the motor on said rotatable part to cause rotation of said part with output from said second gyroscope.

References Cited in the file of this patent
UNITED STATES PATENTS

| | | |
|---|---|---|
| 1,501,886 | Abbot | July 15, 1924 |
| 1,924,037 | Henderson | Aug. 22, 1933 |
| 2,242,253 | Lyman | May 20, 1941 |
| 2,591,697 | Hays | Apr. 8, 1952 |
| 2,631,455 | Wing | Mar. 17, 1953 |
| 2,752,792 | Draper et al. | July 3, 1956 |
| 2,752,793 | Draper et al. | July 3, 1956 |
| 2,762,123 | Schultz et al. | Sept. 11, 1956 |

Notice of Adverse Decision in Interference

In Interference No. 91,643 involving Patent No. 2,902,772, B. H. Ciscel, Gyroscopic compass, final judgment adverse to the patentee was rendered Mar. 1, 1963, as to claims 1 and 6.

[*Official Gazette April 30, 1963.*]